United States Patent
Kramer

[15] 3,706,481
[45] Dec. 19, 1972

[54] VEHICLE SUSPENSION

[72] Inventor: James H. Kramer, Akron, Ohio

[73] Assignee: The B. F. Goodrich Company, New York, N.Y.

[22] Filed: May 15, 1970

[21] Appl. No.: 37,512

[52] U.S. Cl. .................. 305/27, 180/5, 267/57.1, 280/124 A
[51] Int. Cl. ............................................. B62d 55/16
[58] Field of Search..... 305/27; 267/57.1, 57.1 A, 63; 280/124 A, 124 R; 180/5 R

[56] References Cited

UNITED STATES PATENTS

| | | | |
|---|---|---|---|
| 2,773,699 | 12/1956 | Grumman | 267/57.1 R X |
| 3,336,021 | 8/1967 | Kramer | 267/154 |
| 2,444,759 | 7/1948 | Swennes | 305/27 |
| 2,149,297 | 3/1939 | Knox | 267/57.1 A |
| 2,162,198 | 6/1939 | Herrington | 305/27 X |
| 3,386,778 | 6/1968 | Rymes | 305/27 |
| 2,051,864 | 8/1936 | Knox | 305/27 |
| 2,590,711 | 3/1952 | Krotz | 267/57.1 |
| 2,088,341 | 7/1937 | Rabe | 267/57.1 A |

Primary Examiner—Richard J. Johnson
Attorney—W. A. Shira, Jr., Harold S. Meyer and Roger A. Johnston

[57] ABSTRACT

A suspension for traction belt driven vehicles in which each arm of the suspension is permitted to deflect independently of the remaining arms. Movement of the suspension arms about a common pivot shaft is resisted by elastomeric torsion springs attached to the ends of the suspension arms surrounding spaced axial portions of the pivot shaft such that the arms extend in cantilevered arrangement from the shaft. Idler pulleys are rotatably attached to the free end of each arm for contacting the running traction belt.

2 Claims, 4 Drawing Figures

PATENTED DEC 19 1972 3,706,481

INVENTOR.
JAMES H. KRAMER
BY
W. A. Shira Jr.
ATTY.

VEHICLE SUSPENSION

BACKGROUND OF THE INVENTION

Vehicles of the type propelled by endless traction belts are often employed for use in traversing soft terrain such as mud, snow and sand. One popular vehicle of this type is a recreational vehicle used for traveling over snow and ice and commonly known as a snowmobile. Snowmobiles are usually propelled by cord-reinforced elastomeric traction belts sprocket driven and running over idler pulleys.

The suspension system most commonly used for this type of vehicle has a plurality of idlers spaced intermediate the driving sprocket and the idler sprocket at the ends of the traction belt. The suspension usually comprises pairs of arms extending in spaced parallel cantilevered arrangement from a common pivot shaft. The pairs of arms are urged toward each other arcuately about the shaft by a metal torsion spring interconnecting the pairs of arms. The weight of the vehicle is thus supported by deflection of the ends of the suspension arms which deflection is resisted by the torsion spring. Idler pulleys for contacting the interior of the running traction belt are provided on the ends of each of the suspension arms.

The torsion spring suspension arms and the pivot shaft are usually made of a durable metal in order to withstand the forces encountered from impact of the traction belt with obstacles such as rocks or irregular frozen surfaces. Furthermore, the torsion springs must not only provide sufficient force to support the static weight of the vehicle, but must be designed to sustain high frequency deflection while being subjected to contact with water, snow and ice. During service operation of the snowmobile, the prolonged exposure to snow and ice often causes corrosion of metal torsion springs and the moving surfaces of the interconnecting suspension elements and thus early failure of the suspension, or, in some cases, seizure of the suspension arms rendering the arms no longer deflectable. In view of these service problems encountered by the suspension during normal operation of the vehicle, it has been desired to provide a suspension for the vehicle which is not affected adversely by the operating environment and yet one that can be fabricated from materials other than costly corrosion resistant or stainless metals.

Furthermore, it has long been desirable to provide a suspension for the snowmobile which permits independent deflection of one side of the traction belt without causing deflection of the suspension on the opposite side of the belt. Heretofore, in the suspensions for the snowmobile, the suspension arms, as mentioned above, have been attached to the pivot shaft in pairs such that relative rotation of one arm in each pair with respect to the other arm of that pair, is not permitted. Metal torsion springs have been most commonly used to interconnect the pairs of arms in the manner resiliently resisting relative rotation between pairs of arms. The pairs of arms are disposed about the pivot shaft with one pair extending in a direction leading the pivot shaft and the other pair of arms trailing the pivot shaft such that deflection of the suspension causes scissoring of the pairs of arms with respect to each other. Thus, if the traction belt encounters an object on only one side of the belt causing deflection of one forward suspension arm, the corresponding opposite suspension arm on the opposite side of the belt is also caused to deflect and similarly for deflection of either one of the pair of trailing arms. This renders the suspension, and hence, the traction belt, generally noncompliant with surfaces which cause the traction belt to be inclined transversely with respect to the vehicle. This tends to reduce traction, damage the belt, render the vehicle "rough" riding and incapable of traversing satisfactorily uneven terrain, and often results in loss of control of the vehicle.

SUMMARY OF THE INVENTION

The present invention provides a solution to the above-described problem of providing a satisfactory suspension for vehicles of the type utilizing elastomeric traction belts for traversing soft terrain and particularly for the type of vehicle known as the snowmobile. The essence of the improved suspension is the provision of elastomeric spring means supporting the arms of the suspension for individual pivotal movement about a common axis with the spring means resiliently resisting that movement.

The suspension of the present invention, in its preferred embodiment, employs a rigid shaft or bar mounted transversely of the vehicle with a plurality of elastomeric torsion springs surrounding and contacting portions of the bar in axially spaced arrangement along the bar. Suspension arms are attached to the bar with respectively one arm engaging each of the elastomeric torsion springs with each arm extending in cantilevered arrangement from the bar. The arms are arranged in two rows, one row extending forward of the rigid bar and with the second row of arms trailing the bar such that the included angle between the rows is an obtuse angle. Rotational movement of each arm about the bar is individually resisted by the associated elastomeric torsion springs. Idler pulleys are provided respectively on the ends of each of the suspension arms for contacting the interior surface of the running traction belt thus providing a vehicle suspension.

The present invention thus provides a solution to the problem of providing an independent suspension for a snowmobile.

DETAILED DESCRIPTION OF THE INVENTION

Figure 1:
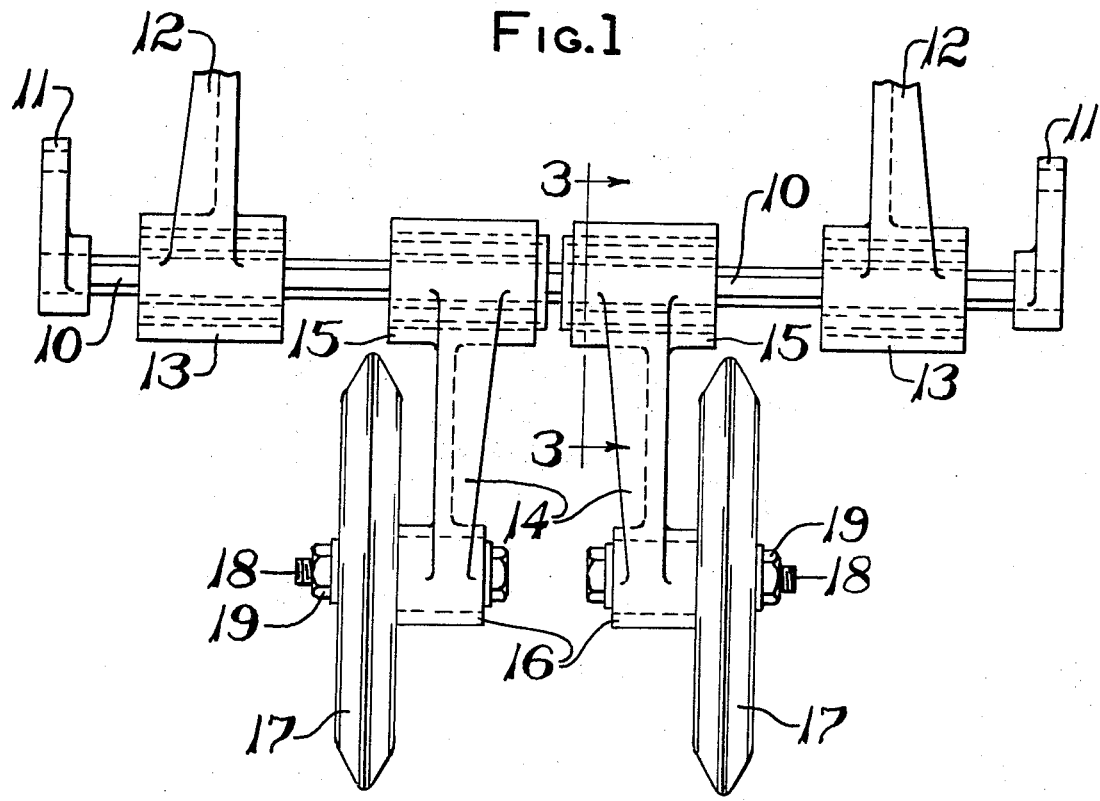
FIG. 1 is a plan view of a portion of a vehicle suspension, having a pair of leading arms and a pair of trailing arms, incorporating the presently preferred embodiment of the invention.
Figure 3:
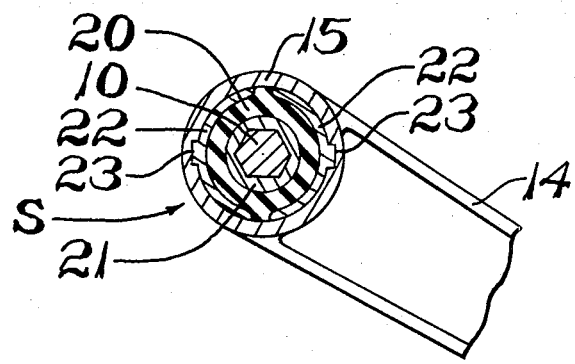
FIG. 3 is a cross section take along section indicating lines 3—3 of FIG. 1 showing the details of the elastomeric spring between the arm and the pivot shaft; and, FIG. 4 is a view similar to FIG. 3 illustrating an alternative form of the embodiment of FIG. 3.
Figure 2:
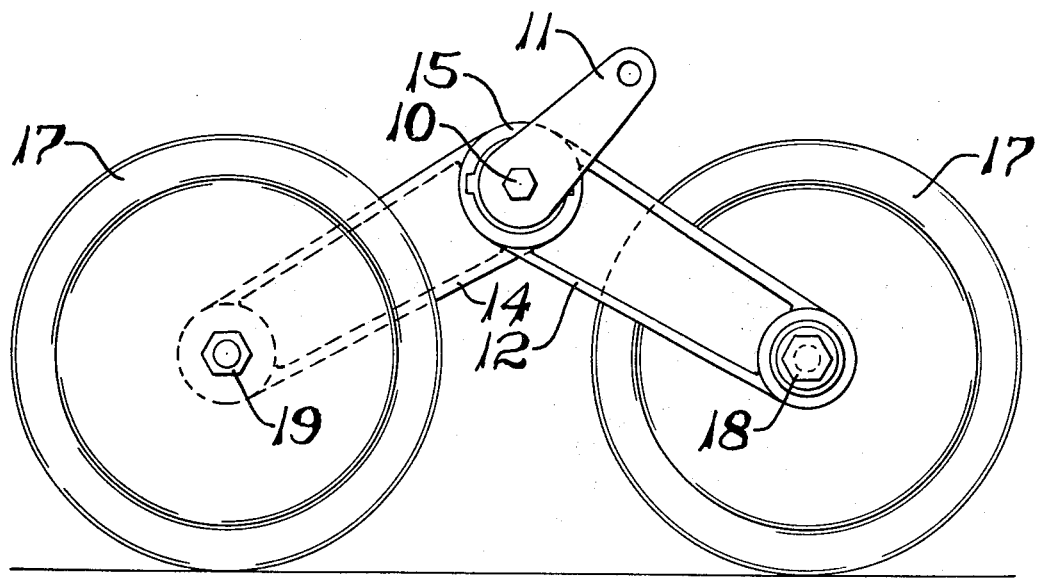
FIG. 2 is a side elevation view of the embodiment of FIG. 1.

Referring now to FIGS. 1, 2 and 3, the suspension has a pivot shaft or bar 10 of rigid material, preferably metal, with a preferably transverse polygonal cross section that is adapted to be supported on a vehicle by spaced mounting brackets 11, each having one end rigidly attached to an end of the pivot shaft 10 and the other end formed with a bolt hole or other expedient adapted for mounting on a vehicle frame, not shown. A pair of leading suspension arms 12 is provided, with each arm having a hollow hub portion 13 with the pivot shaft 10 passing through the bore of the hub. The arms 12 are arranged adjacent the ends of the bar 10 extending cantilevered therefrom in axially spaced parallel arrangement. A pair of trailing arms 14 having hollow hubs 15, with the pivot shaft 10 passing therethrough, are disposed in axially spaced cantilevered arrangement axially intermediate the pair of arms 12. The pair of arms 14 extend generally from the opposite side of the bar from the arms 12 in a manner such that an obtuse central angle is subtended between the pairs of arms 12 and 14. Each of the pairs of arms 12, 14 has an elastomeric torsion spring provided in the bore of the hubs 13,15 intermediate the hubs and the shaft 10. If desired, spacers (not illustrative) may be provided on the pivot shaft to retain the arms in their respective axial positions.

The weight of the vehicle is supported by torsional preload on each of the elastomeric springs and running deflection of the traction belt is absorbed by rotation of the suspension arms respectively about the rigid shaft and with consequent deflection of the torsion springs. Rotation of one of the suspension arms about the shaft is resiliently resisted by only one of the elastomeric springs and, hence, no rotational force is exerted on any of the other suspension arms. Each of the arms is thus independently supported from the rigid shaft in a manner which does not affect the other arms. Furthermore, the present invention has no metal-to-metal contacting surfaces in the pivot portions and therefore is not subject to failure or seizure by corrosion.

Each of the torsion springs S, as illustrated in FIG. 3, has an annular ring of of elastomer 20 with an inner shell 21 of metal bonded thereto, the shell having a polygonal bore engaging the bar 10 of like cross sectional configuration and dimensions in a manner preventing relative rotation therebetween. Each elastomeric ring 20 further has an outer shell 22 surrounding the outer periphery thereof, preferably in the form of two half shells, with each half shell bonded to the elastomer, had having a radial lug portion 23 extending from its outer periphery and engaging a corresponding recess in the hub, such as 15, of the arm in which it is positioned. This feature permits longitudinal assembly of the spring into the hub of the arm in a manner preventing relative rotation between the arm and the shell 22 of the spring. The construction of the elastomeric spring in the presently preferred form of the invention is that disclosed in U.S. Pat. No. 3,336,021. However, the invention may also be practiced with elastomeric torsion springs other than the particular spring form disclosed in the referenced patent.

Each of the pairs of suspension arms 12,14 has a spindle hub 16 provided on the free end thereof with an idler wheel 17 attached to the spindle hub by suitable means, such as a bolt 18, the outer end of which is threaded and provided with a nut 19, so that the wheels 17 are free to rotate about the bolt. In the preferred practice of the invention, sleeve bearings and thrust washers (not illustrated) are provided on the bolts 18 to permit free rotation of the idler wheels 17.

Figure 4:
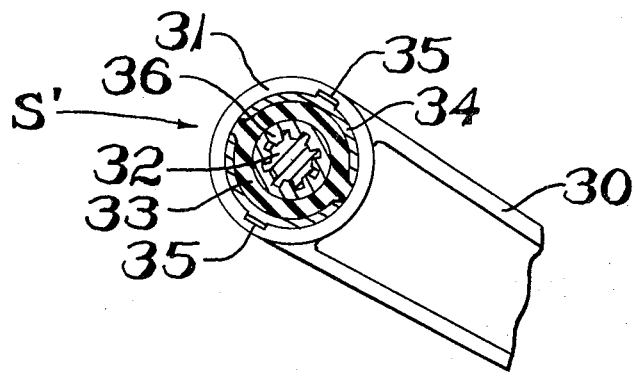

Referring now to FIG. 4, an alternative form S' of the embodiment of FIG. 1 is shown in which a typical one of the suspension arms, designated 30, is shown as having a hollow hub portion 31. A rigid pivot shaft 32 is received through the bore of hub 31 with the shaft 32 having a circular cross section a portion of the outer periphery of which is longitudinally splined in the region axially coincident with the hub 31 of the suspension arm. An elastomeric ring 33, of generally annular shape, is provided radially intermediate the shaft 32 and the hub 31 of the arm. The ring 33 preferably has an outer shell 34 enclosing the outer periphery of the ring 33 and bonded thereto preventing relative rotation between the outer periphery of the spring and the inner periphery of the shell. The shell 34 is preferably formed of two similar circumferential half-shells with lug portions 35 engaging recesses found in the hub 31 of the arm, similar to the embodiment of FIG. 1 and FIG. 3. The ring 33 further has an inner shell 36, provided intermediate the elastomeric material and the shaft 32, with the inner shell 36 having the external surface bonded to the elastomeric material and the inner periphery splined axially to engage the corresponding axial splines provided on the outer periphery of the shaft 32. The embodiment of FIG. 4 is employed where it is desired to provide greater torsional preloads on the elastomeric spring and thus utilizes the spline for absorbing and transmitting the greater preload torque.

The present invention thus comprises a suspension for track driven vehicles having a plurality of suspension arms independently and resiliently connected to a common rigid pivot shaft by means of individual axially spaced elastomeric torsion springs with the suspension arms extending in cantilevered arrangement from the pivot shaft and with each arm adapted to be deflected rotationally about the pivot shaft independently of the remaining suspension arms.

Modifications and adaptations of the invention may be made by those having ordinary skill in the art and the invention is limited only by the spirit and scope of the following claims.

I claim:

1. A suspension for track propelled vehicles comprising:
   a. rigid pivot means including a rigid bar having a polygonal transverse cross section and a pair of support brackets each having an end portion rigidly attached respectively one to each end of said bar with mounting portions formed on the free end of each bracket for attachment to the frame of a vehicle to be suspended;
   b. a plurality of torsion springs formed of elastomeric material each circumferentially engaging individual axially spaced portions of the bar of said pivot means in a manner independently and resiliently resisting rotation of each of said springs about said pivot means;
   c. a plurality of rigid arms each having an end portion surrounding and engaging one of said springs in a manner resiliently resisting rotation of each arm about said pivot means, respectively, with each of said arms extending in cantilevered arrangement from said pivot means with at least two of said arms disposed in diverging relationship with respect to each other about said pivot means; and, d. an idler member attached to each of said arm members and adapted to operatively contact guide portions of an endless track.

2. The suspension defined in claim 1, wherein each torsion spring comprises:
   a. a metallic inner shell having a polygonally shaped axially extending central opening and a cylindrical outer surface,
   b. an annular metallic outer shell coaxial with said inner shell and radially spaced therefrom,
   c. an annulus of elastomeric material between said inner and outer shell integrally bonded to both,
   d. the said pivot means having the said axially spaced portions formed with a cross section of polygonal shape complementary to and axially interfitting with the central opening of each of said inner shells, and
   e. the outer surface of said outer shell and the inner surface of the portion of each of said arms surrounding said pivot means having cooperating complementarily shaped portions for preventing relative rotation.

* * * * *